(12) United States Patent
Rao et al.

(10) Patent No.: US 8,913,677 B2
(45) Date of Patent: Dec. 16, 2014

(54) SYMBOL TIMING RELATIVE OFFSET MULTI ANTENNA SYSTEM AND METHOD

(75) Inventors: Bhaskar D. Rao, San Diego, CA (US); Aniruddha Das, Carlsbad, CA (US)

(73) Assignee: The Regents of the University of California, Oakland, CA (US)

(*) Notice: Subject to any disclaimer, the term of this patent is extended or adjusted under 35 U.S.C. 154(b) by 1283 days.

(21) Appl. No.: 12/673,529

(22) PCT Filed: Aug. 19, 2008

(86) PCT No.: PCT/US2008/009876
§ 371 (c)(1),
(2), (4) Date: Apr. 1, 2011

(87) PCT Pub. No.: WO2009/042019
PCT Pub. Date: Apr. 2, 2009

(65) Prior Publication Data
US 2011/0176628 A1    Jul. 21, 2011

Related U.S. Application Data

(60) Provisional application No. 60/965,360, filed on Aug. 20, 2007.

(51) Int. Cl.
*H04B 7/02* (2006.01)
*H04L 1/02* (2006.01)
*H04B 7/06* (2006.01)

(52) U.S. Cl.
CPC .................................. *H04B 7/0671* (2013.01)
USPC ............ 375/267; 375/299; 375/347; 375/348

(58) Field of Classification Search
CPC ......... H04B 7/0894; H04B 7/00; H04B 7/024
USPC ................... 375/267, 347, 348, 299
See application file for complete search history.

(56) References Cited

U.S. PATENT DOCUMENTS

| | | | |
|---|---|---|---|
| 6,917,821 B2* | 7/2005 | Kadous et al. | 455/562.1 |
| 7,356,089 B2* | 4/2008 | Jia et al. | 375/267 |
| 2001/0019592 A1 | 9/2001 | Solondz | |
| 2003/0198305 A1 | 10/2003 | Taylor et al. | |
| 2005/0068918 A1* | 3/2005 | Mantravadi et al. | 370/328 |
| 2007/0099571 A1 | 5/2007 | Withers, Jr. et al. | |
| 2007/0211816 A1* | 9/2007 | Hwang | 375/267 |

(Continued)

OTHER PUBLICATIONS

Foschini, G.J. et. al., "Simplified Processing for High Spectral Efficiency Wireless Communication Employing Multi-Element Arrays", *IEEE Journal on Selected Areas in Communications*, vol. 17, No. 11, Nov. 1999.

(Continued)

*Primary Examiner* — Qutbuddin Ghulamali
(74) *Attorney, Agent, or Firm* — Greer, Burns & Crain, Ltd

(57) ABSTRACT

A multi-antenna communication method. A transmitter accepts a plurality of n data sources, and a plurality of MT independent data streams are prepared for transmission through a plurality of MT different antennae. The transmitter introduces a sub-symbol offset between symbols in the plurality of MT independent data streams transmitted by adjacent ones of the plurality of MT different antennae. Receivers for receiving and processing the Mτ independent data streams are also provided.

15 Claims, 12 Drawing Sheets

(56) References Cited

U.S. PATENT DOCUMENTS

2008/0101496 A1* 5/2008 Gaikwad .................. 375/267
2008/0107168 A1* 5/2008 Xia et al. .................. 375/233
2010/0014504 A1* 1/2010 Sun et al. .................. 370/345

OTHER PUBLICATIONS

Lozano, Angel et. al., "Layered Space-Time Receivers for Frequency-Selective Wireless Channels", *IEEE Transactions on Communications*, vol. 50, No. 1, Jan. 2002.

Tan, Jun et al., "Multicarrier Delay Diversity Modulation for MIMO Systems", *IEEE Transactions of Wireless Communications*, vol. 3, No. 5, Sep. 2004.

Bohnke, et al., "Reduced Complexity MMSE Detection for BLAST Architectures", *Global Telecommunications Conference, 2003, Globecom 03*; vol. 4, pp. 2258-2262, 2003.

Foschini, G.J. et al., "On Limits of Wireless Communications in a Fading Environment when Using Multiple Antennas", *Wireless Personal Communications*, 6, pp. 311-335, 1998.

Wittneben, Armin, "A New Bandwidth Efficient Transmit Modulation Diversity Scheme for Linear Digital Modulation", *ICC 93. Geneva. Technical Program, Conference Record, IEEE International Conference on Communications*, pp. 1630-1634 vol. 3, 1993.

* cited by examiner

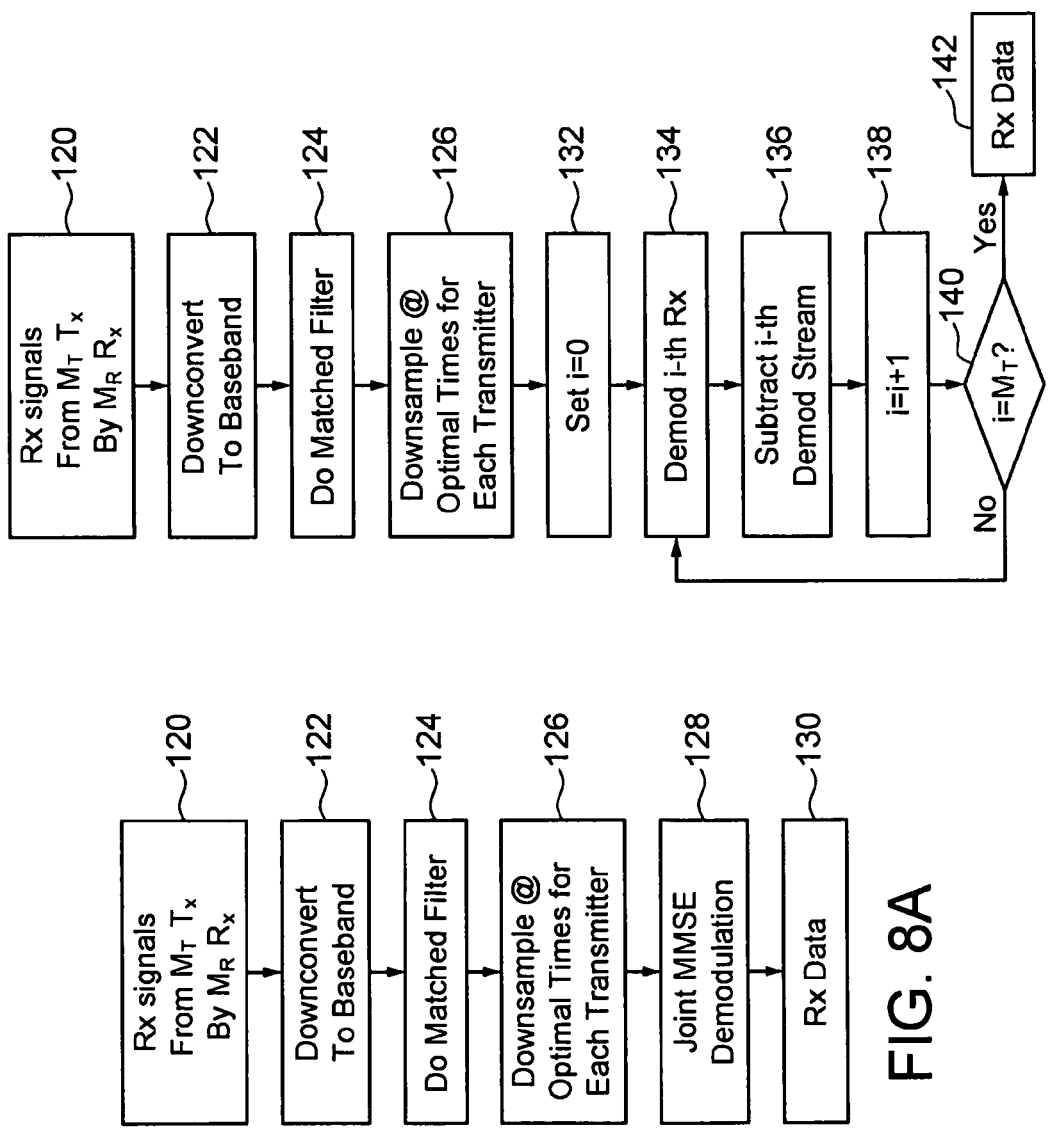
FIG. 8C
FIG. 8B
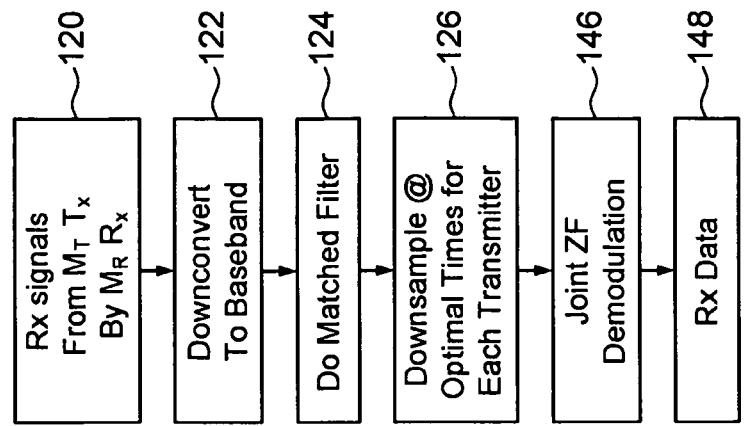
FIG. 8A

SYMBOL TIMING RELATIVE OFFSET MULTI ANTENNA SYSTEM AND METHOD

PRIORITY CLAIM

This application claims the benefit of U.S. Provisional Patent Application Ser. No. 60/965,360, filed Aug. 20, 2007, under 35 U.S.C. §119.

TECHNICAL FIELD

A field of the invention is multi-antenna communication systems.

BACKGROUND ART

Multiple input multiple output (MIMO) communication systems using multiple antennae are gaining commercial acceptance as such systems provide an increased spectral efficiency of point-to-point digital communication systems under certain channel conditions. In MIMO communications, symbols (representing bits) are sent from each antenna, and under some channel conditions, result in an increased bit rate without the large power increase required for single antenna point-to-point methods. Over the past decade researchers have shown that significant increases in capacity, and more efficient power usage, can be realized by using multiple antennas at a transmitter and at a receiver.

Efficient power usage improves the user experience because it directly translates to increased operating times and/or smaller portable power sources. Increased operating times are beneficial in any device that uses a portable power source, such as a battery or a fuel cell. Smaller portable power sources also reduce operating expense. Additionally, designers can produce portable devices, e.g., wireless handsets, laptop computers, etc. with more elegant and compact designs or room for additional electronics and features. Smaller power sources can also be less expensive, which leads to lower-cost electronic devices. MIMO technology has matured and is gradually being incorporated into various standards, such as 802.16 (WiMax) and 802.11n.

However, the efficiency gains seen thus far in practice have not sufficiently approached the maximum theoretical gains. To realize the gains predicted from theory, one of the popular methods used is the Vertical-Bell Labs Layered Space-Time (VBLAST) architectures, in which multiple antennas are used at the transmitter as well as at the receiver to achieve spectral efficiencies of 20-40 bps/Hz. Though methods such as VBLAST can be shown, theoretically, to be capacity achieving under idealized transmission conditions, in practice fixed size constellations are employed, and band limited pulse shaping, such as the raised cosine pulse, is employed to deal with band-limited channels. This leads to inefficiencies, leaving room for improvement.

It would be useful to provide a transmission and reception method that is simple to implement and that can work more efficiently than conventional methods.

DISCLOSURE OF THE INVENTION

A multi-antenna communication method is provided according to embodiments of the present invention. A transmitter accepts a plurality of n data sources, and a plurality of $M_T$ independent data streams are prepared for transmission through a plurality of $M_T$ different antennae. The transmitter introduces a sub-symbol offset between symbols in the plurality of $M_T$ independent data streams transmitted by adjacent ones of the plurality of $M_T$ different antennae.

A method for receiving a wireless communication is also provided according to embodiments of the present invention. $M_R$ receive antennas receive independent transmitted signals representing data from $M_T$ (at least two) transmit antennas, where the transmitted signals include a sub-symbol offset between symbols transmitted by adjacent ones of the $M_T$ transmitters. The $M_R$ receivers downconvert the received signals and use a matched filter to filter them. The matched filter comprises a filter matched to the pulse shape of each of the $M_T$ transmitters. In general, each transmitter could have a different or same pulse shape. The filtered received signal is processed to estimate the transmitted data.

BRIEF DESCRIPTION OF THE DRAWINGS

FIGS. 8A-8C show example reception methods for processing received signals, where FIG. 8A shows Joint Minimum Mean Square Error (JMMSE) receivers, FIG. 8B shows a successive interference cancellation receiver, and FIG. 8C shows Joint Zero Forcing (ZF) receivers, respectively;

BEST MODE OF CARRYING OUT THE INVENTION

Figure 1:
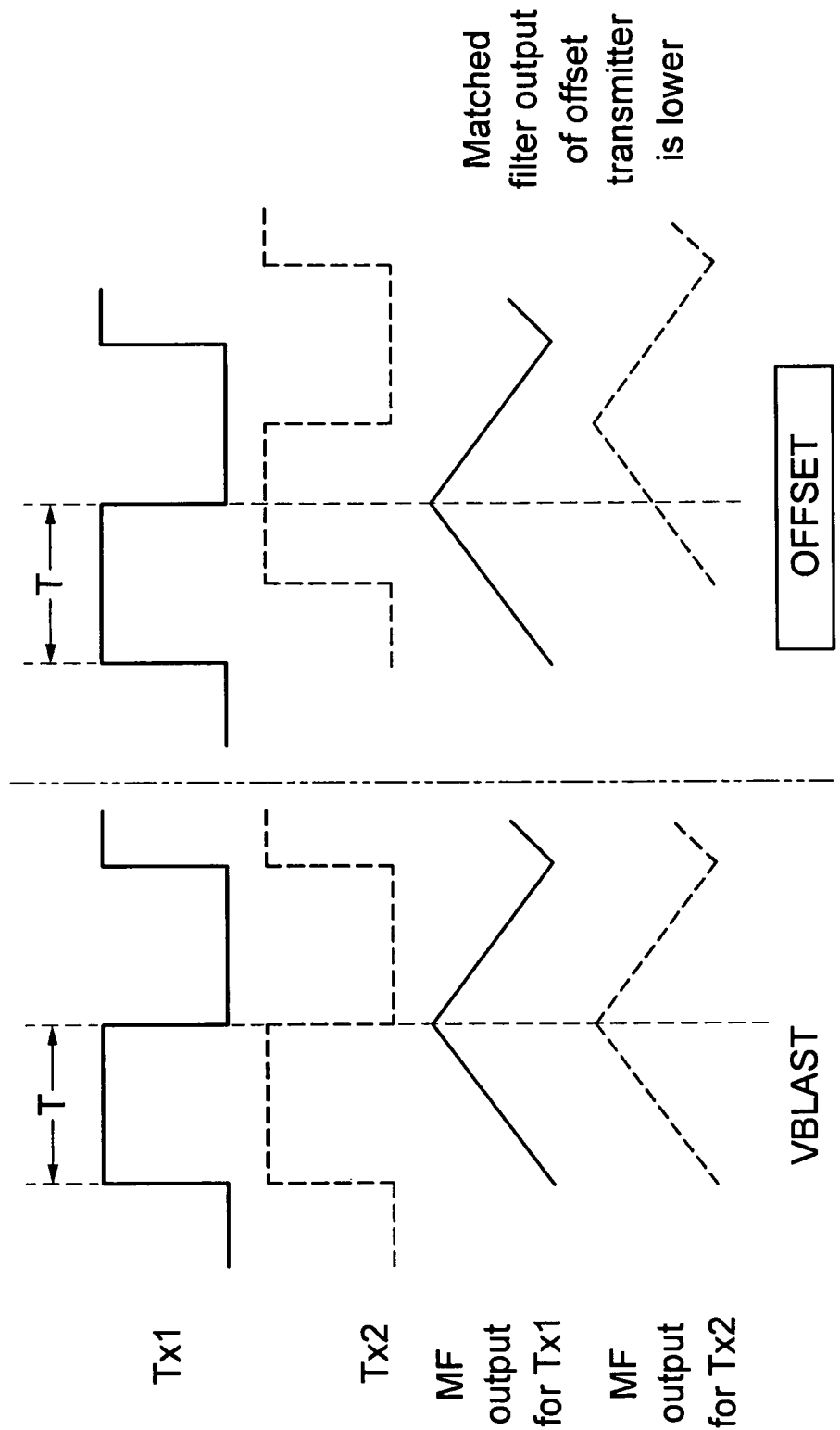
FIG. 1 shows a reduction of interference power provided by a method of the present invention as compared to a prior method (VBLAST)

Embodiments of the present invention provide, among other things, relative timing offset multi-antenna transmitter systems, receivers, and communication methods. An embodiment of the invention includes a method for coordinated transmission between the signals from different transmitters. In an example method, non-zero, but known, timing offsets of a sub-symbol duration are inserted between transmitted signals. This leads to lower multiple access interference at the receiver, thus leading to improved performance in a multi-antenna communication system. For a given power budget, embodiments of the invention can achieve higher performance than typical multi-antenna systems and methods. For a given performance level, embodiments of the invention can achieve lower power consumption than typical multi-antenna systems and methods. In another usage scenario, for a given performance level, embodiments of the invention can withstand higher noise levels than conventional MIMO systems.

The timing offset provided by embodiments of the present invention leads to a reduction in interference. A receiver can utilize this information to extract significant performance gains. These gains come primarily from two sources. First, offsetting the waveforms from the different transmitters reduces mutual interference power between the different data streams. Second, the offset introduces inter-symbol interference that may be used to predictively cancel the interference. Example transmission methods can be used in conjunction with different kinds of receivers. Compared to some conventional receivers having no timing offset, example methods of the present invention can achieve significant performance gains.

While certain known schemes, such as delay diversity schemes, introduce a known offset between transmit antennas, they aim to increase spatial diversity by transmitting the same data (or a transformation of the same data). On the other hand, in embodiments of the present invention, independent data streams are transmitted from the different antennae, preserving maximum spatial multiplexing gain. Further, in delay diversity schemes, the delays introduced are typically of a symbol duration or longer, whereas methods of the present invention use an inter-transmitter timing offset of a sub-symbol duration.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

A general description of methods of the present invention will first be provided. For clarity of description, certain methods of the present invention will be described in comparison to VBLAST. Most MIMO transmitter schemes assume that the signals from the different transmitters are synchronous and symbol aligned. In general, this is a reasonable assumption, as the different antennas are typically co-located and so the relative timing between them can be carefully controlled. In VBLAST, each receiver chain downconverts the received signal to baseband, carries out analog to digital conversion, and then employs matched filtering, before down sampling the received signal to the system symbol rate. Assuming equal channel gain, the signals from the symbol aligned transmitters contribute equal power to the received signal at the output of the downsampled received matched filter. VBLAST assumes that in a rich scattering environment, the channel gains are statistically independent, and thus can spatially separate the different transmitted waveforms even though they are received in the same time slot and same frequency.

In embodiments of the present invention, by contrast, the transmitters' symbol boundaries are offset in time relative to each other. FIG. 1 shows an example of this for rectangular pulse shaping. In FIG. 1, "Tx1" refers to Transmitter 1, "Tx2" refers to Transmitter 2, and so on. Under this embodiment, when receiver matched filtering is employed, under equal gain channel conditions the signals from the two transmitters are not of the same power at the same time. Indeed it may be seen from FIG. 1 that at the optimal sampling time for one transmitter, the received signal power of the other transmitter is lower. It should be noted that the optimal sampling time of the matched filter for the two transmitters is not the same.

In embodiments of the present invention, a relative timing offset smaller than the symbol duration is intentionally introduced between the signals transmitted by the different transmitters. This is illustrated more particularly in FIG. 2, which shows an offset of $\tau$ in a particular embodiment having two transmit antennas (Tx1, Tx2) and two matched filter receivers (Rx1, Rx2). The symbol duration is denoted by T with $0 \leq \tau < T$. Other embodiments, using $M_T$ antennas, may have different $\tau$ offsetting the signals from the different transmitters.

Note that the ability to insert and maintain this relative symbol timing relationship between the transmit signals from the different antennas can be accomplished using similar techniques as for existing systems that assume that the signals from the different signals have zero relative offset, though any suitable technique may be used. For example, methods of maintaining this relationship for co-located transmitters operating on the same oscillator will be appreciated by those of ordinary skill in the art, though it is not required that the transmitters be co-located.

Figure 2:
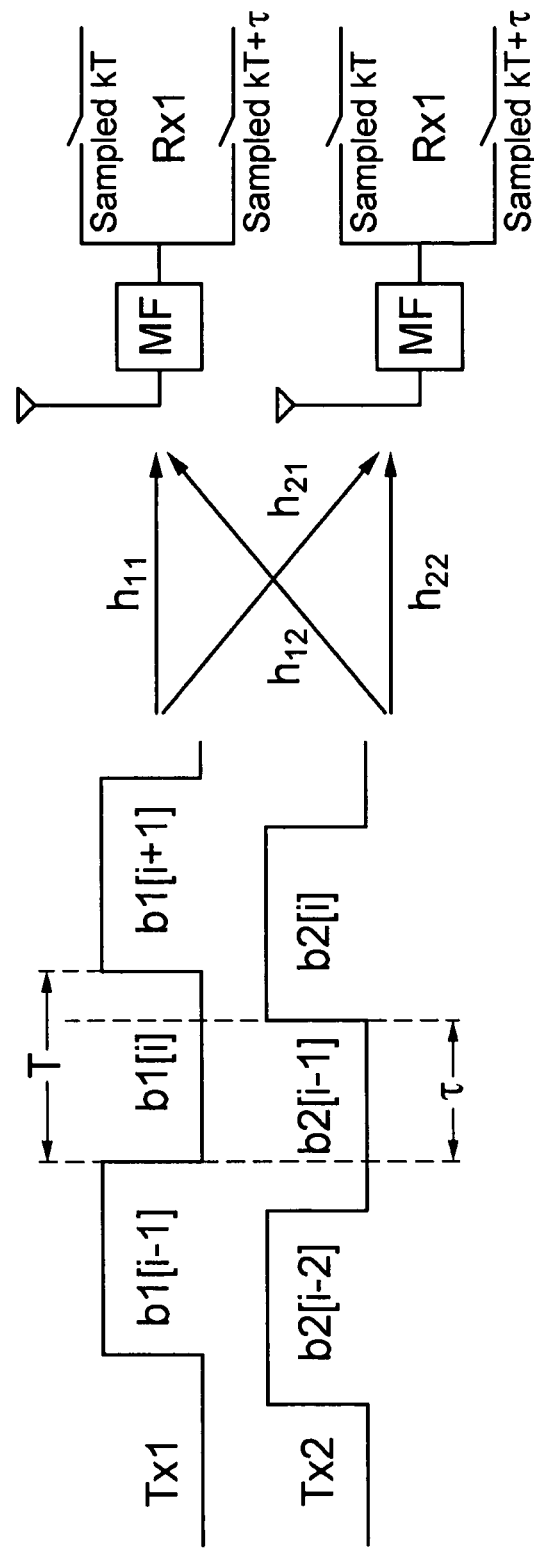
FIG. 2 shows an example of sub-symbol timing offset, according to an embodiment of the present invention.

Also, in FIG. 2, the transmit signals are depicted with a rectangular pulse shape. However, methods according to the present invention are not to be limited to a rectangular pulse shape. Methods of the present invention are also applicable, for example, for a more bandwidth efficient scheme, such as but not limited to schemes using Nyquist filters. Nonlimiting examples of schemes using Nyquist filters include using Square Root Raised Cosine (SRRC) pulse shaping filters on the transmit signals. Although FIG. 2 shows both the transmitted signals to be using the same pulse shape, in general each transmitted waveform could use a different pulse shape.

For clarity of description considering, as a nonlimiting example, a block flat fading model, the interference in a point to point MIMO system is due to the interference between the transmissions from the multiple transmitters. For example, in a 2×2 system (i.e., $M_T=2$, $M_R=2$), the symbol transmitted from antenna 1 at any time instant interferes with the corresponding transmission from antenna 2. In a staggered scheme according to embodiments of the invention, the symbol transmitted from antenna 1 at any time instant experiences interference from the adjacent symbols transmitted from antenna 2. However, due to the pulse shaping employed, the net power in the interference can be shown to be lower. Hence, by designing the receiver properly, this can be exploited to improve overall system performance. The gains depend on the shape of the pulse employed.

The interference when using a timing offset is caused by more than one symbol of the interferer. Thus, to extract maximum performance gains, a windowed receiver is preferred. However, other receivers, including one-shot receivers, can achieve benefits according to embodiments of the present invention, as will be described below with respect to particular embodiments.

Additionally, each receiver antenna samples the matched filter outputs such that it is synchronized to the different relative timing offsets of the transmit pulses. In conventional MIMO systems, the output of the matched filter is typically sampled at the optimal sampling point for the transmitters. In a system according to embodiments of the present invention, by contrast, each transmitter has a different optimal sampling time and so the output of the matched filter should be sampled at the optimal sampling times for each transmitter.

Figure 3:
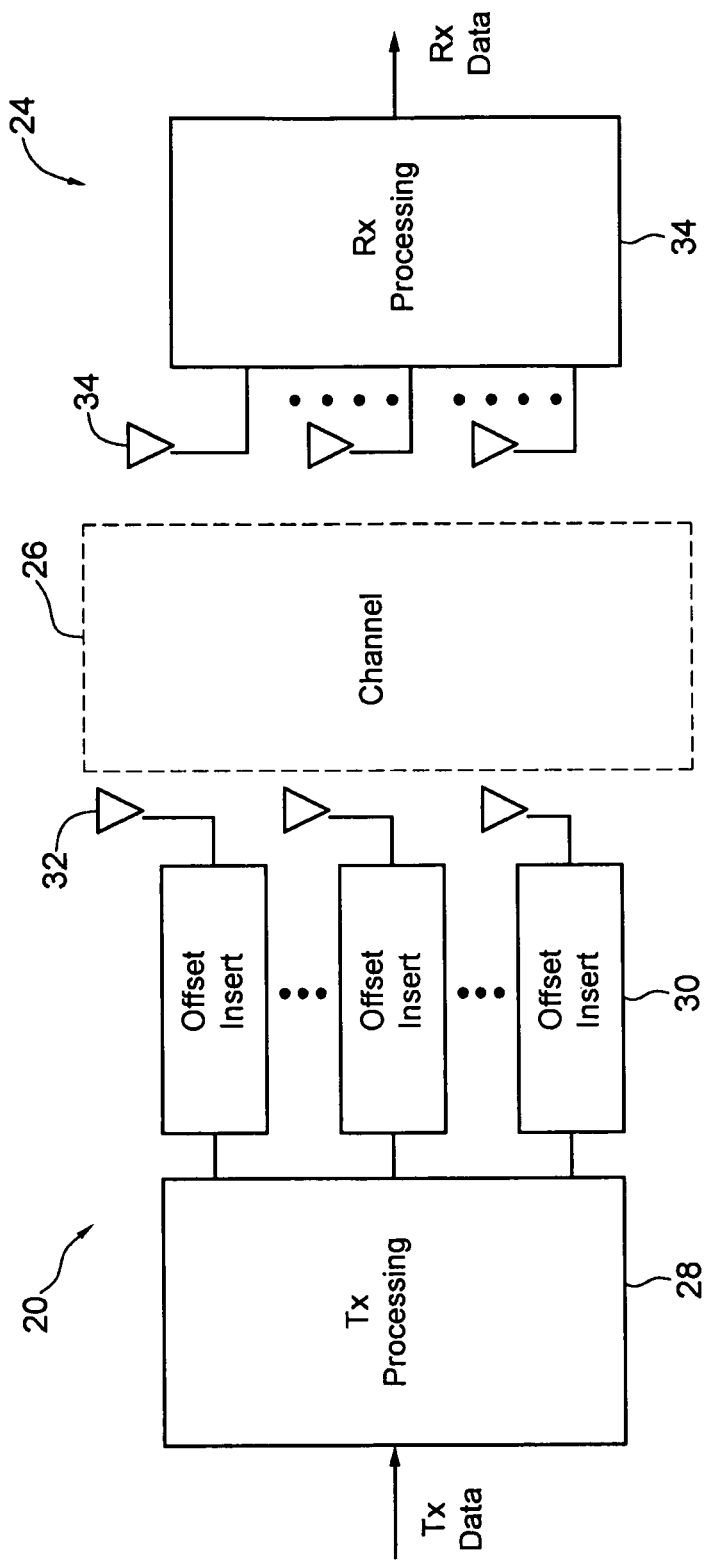
FIG. 3 shows an example transmission and receiving system according to an embodiment of the present invention.

FIG. 3 shows a transmission and receiving system 20 according to embodiments of the present invention. The system 20 includes a transmitter 22 and a receiver 24, separated by a channel 26. Within the transmitter 22, a transmission processor 28 receives data to transmit, and prepares the data, for example using MIMO methods. For each antenna, the transmitter 22 introduces a sub-symbol offset 30 before the particular symbol is transmitted by suitable antennae 32 as wireless signals. Receiving the wireless signals over the channel 26 via antennae 34, the receiver 24 includes suitable receiver processing 34 for converting the received wireless signals into received data. Nonlimiting examples of the transmitter processor 28 and the receiver processor 34 include suitably configured application-specific integrated circuit (ASIC), hardware, firmware, etc.

Figure 4:
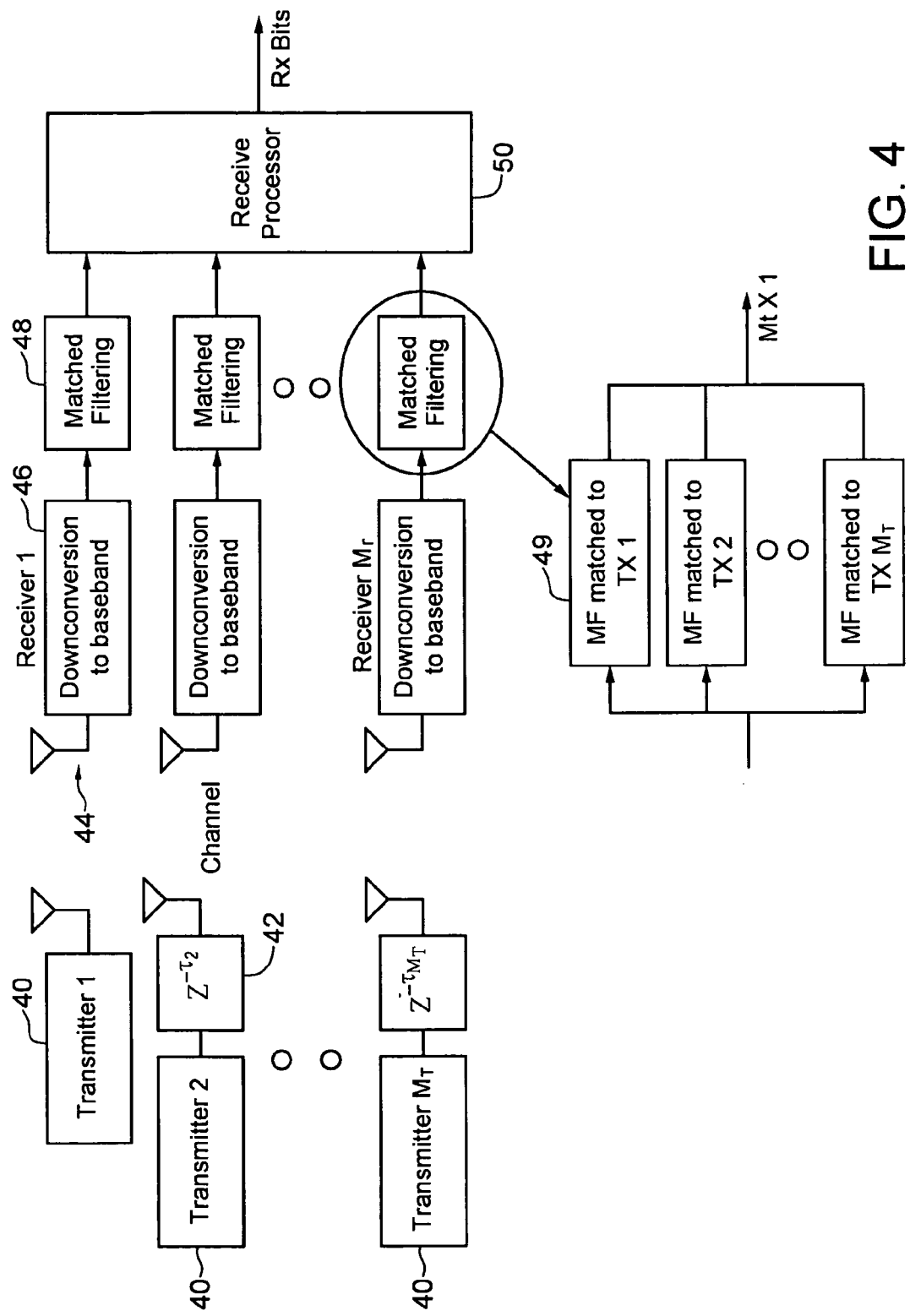
FIG. 4 shows a more particular example of a transmission and receiving system.

FIG. 4 shows a more particular system block diagram for $M_T \times M_R$. For each of the $M_T$ transmitters (and antennas) 40, an offset 42 is introduced for the transmitters relative to one another, where $z^{-r}$ refers to a delay of $\tau$. Additionally, though the offset is described herein as being between "adjacent" transmitters, it is not required that the transmitters be physically adjacent, but rather "adjacent" refers to a transmitter for a preceding or following transmission. Each of the $R_T$ receivers 44 includes a downconverter 46 for downconverting the received signal, and includes matched filters 48 for filtering the transmitted signals. Each of the matched filters 48 itself includes a filter 49 matched to each of the transmitters 40, which can be provided by including a separate filter, or by having one matched filter per receiver and sampling the output every $T/M_T$, instead of every T. If each transmitter has a separate pulse shape, then the receiver must have one matched filter matched to each of the different transmit pulse shapes. The matched filter output for each of the receivers 44 is fed to a receiver processor 50 for processing the output and producing received data.

Figure 5:
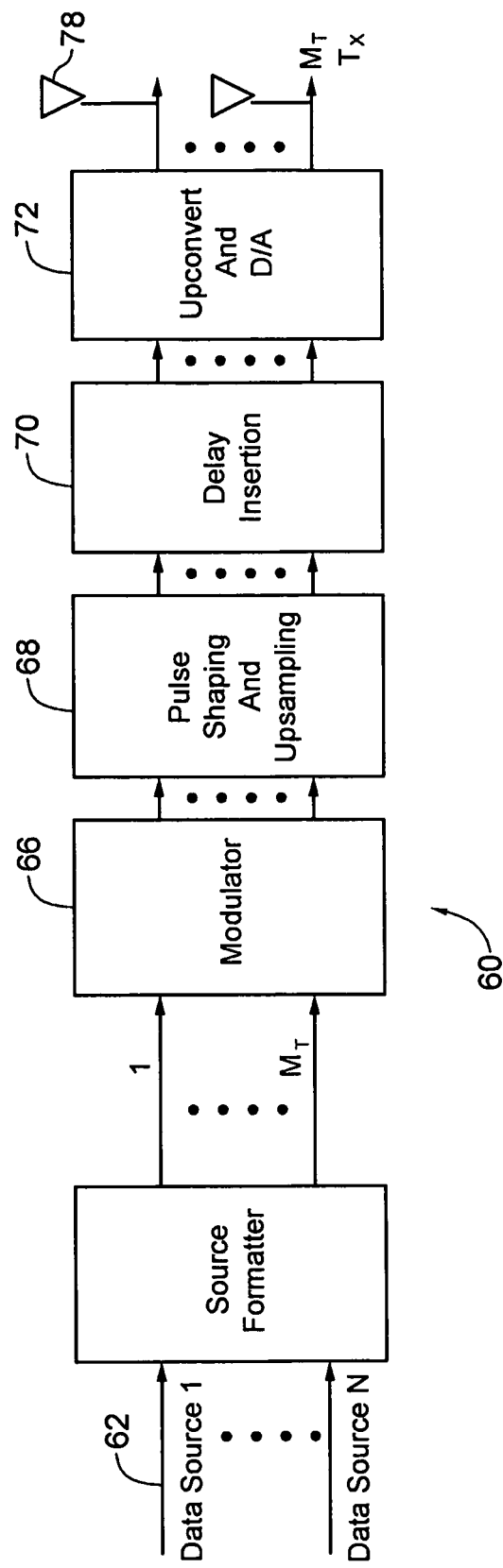
FIG. 5 shows an example transmitter according to an embodiment of the present invention.

FIG. 5 shows an example transmitter 60, including transmitter processing. For each of N data sources 62, the transmitter 60 formats 64 the source data and modulates 66 the source data. A pulse shaper and up-sampler 68 produces an upsampled pulse for the modulated data. A delay inserter 70 introduces the timing offset, and the pulses are upconverted and converted to analog 72 for transmission over $M_T$ transmitter antennae 78.

Figure 6:
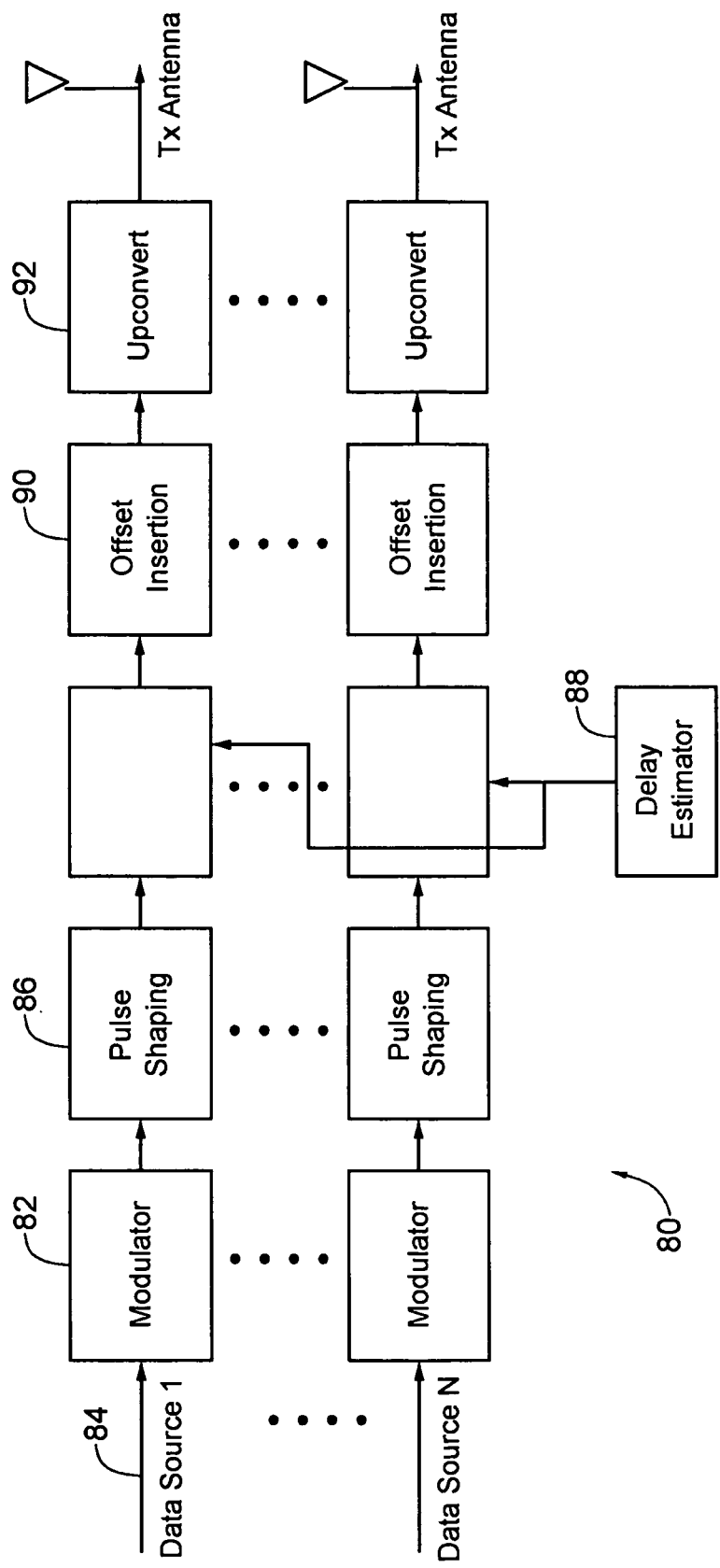
FIG. 6 shows an example transmitter including a delay estimator.

FIG. 6 shows a transmitter 80 including delay estimation. The transmitter 80 modulates 82 the source data 84, and shapes a pulse 86 based on the modulated source data. A delay estimator 88 is introduced to estimate an optimal delay for providing a timing offset 90 before transmitting the data. The pulses with the timing offsets then go through an upconverter 92 and analog conversion before transmission via suitable antennas.

Figure 7:
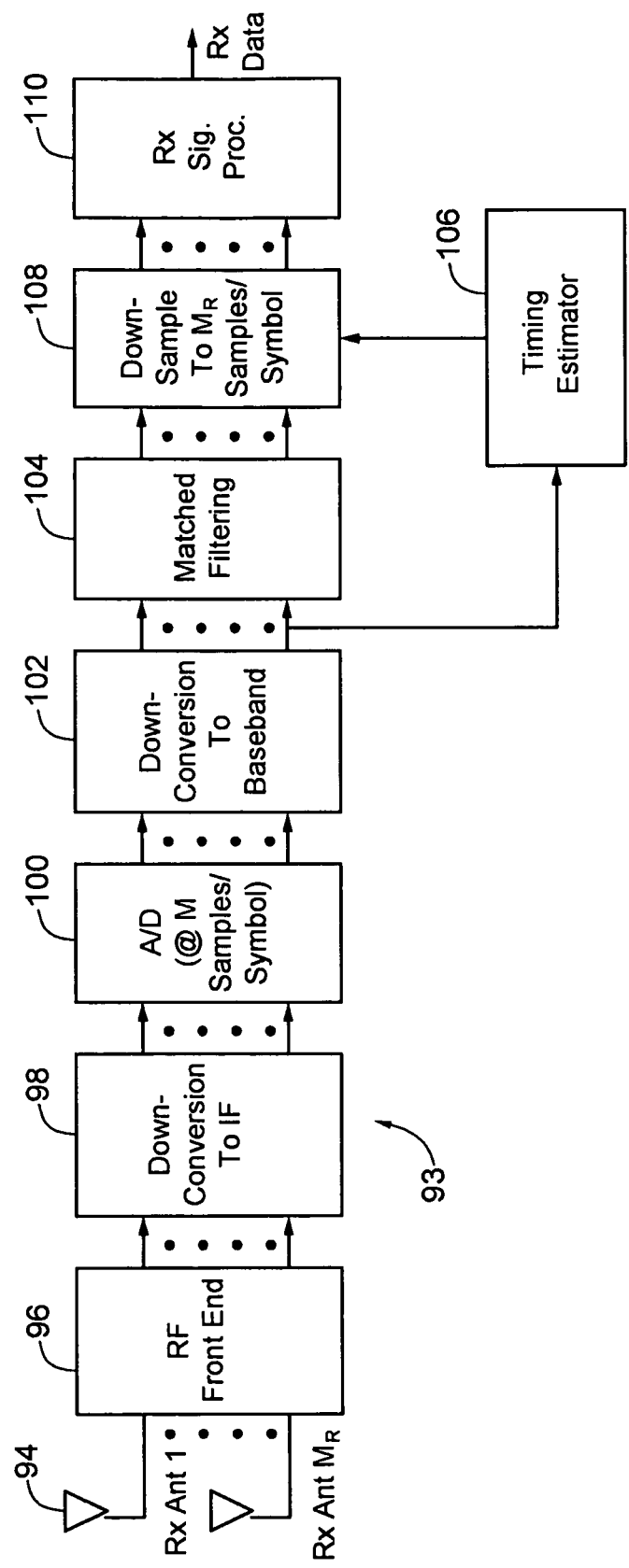
FIG. 7 shows an example receiver according to embodiments of the present invention.

FIG. 7 illustrates a more particular example of a receiver 93 for receiving and processing data received from antennas 1-$M_R$ 94. An RF front end 96 performs suitable RF processing on the received signal from the antennas 94, and a downconverter 98 downconverts the signal to an intermediate frequency (IF). An A/D converter 100 digitally converts the signal, for example at a sample rate of M samples/symbol. The signal is downconverted to baseband 102. The baseband samples are sent to both a matched filter 104 as well as a timing estimator block 106. The timing estimator 106 indicates the optimal sampling times and feeds that to the output of the matched filter 104. This information is then used in a later block such as a downsampling block 108, where the output of the matched filter is downsampled and eventually sent to a receiver processing block 110 for more receiver processing (e.g., demodulating) to try to recover the transmitted waveform.

FIGS. 8A-8C illustrate example methods for receiving a wireless transmission using a receiver such as the receiver shown in FIG. 7, for three example demodulation schemes: Joint Minimum Mean Square Error (JMMSE) demodulation (FIG. 8A), successive interference cancellation (FIG. 8B), and Joint Zero Forcing (ZF) (FIG. 8C). In each example method, $M_R$ receivers are used to receive signals 120 from $M_T$ transmitters. The received signals are downconverted 122 to baseband. Next, matched filtering 124 is conducted to filter the signal for each transmitter. At preferably optimal times for each transmitter (e.g., as determined by the timing estimator 106 shown in FIG. 7), the filtered signal is downsampled 126.

After downsampling, the signal is demodulated to recover the data (transmitted waveform). In FIG. 8A, Joint MMSE demodulation is performed 128 to provide received data 130. For the successive interference cancellation receiver method shown in FIG. 8B, a transmitter number i is set to zero 132, the downsampled signal for the i-th receiver is demodulated 134, and the i-th demodulated stream is subtracted 136. The transmitter number i is incremented 138, and it is determined 140 whether the transmitter number is equal to the number of transmitters. If so, the received data is recovered 142. If not, the downsampled signal for the next transmitter is demodulated 134. For the Joint ZF demodulation scheme shown in FIG. 8C, the downsampled signal undergoes Joint ZF demodulation 146, and the received data is recovered 148.

Figure 9:
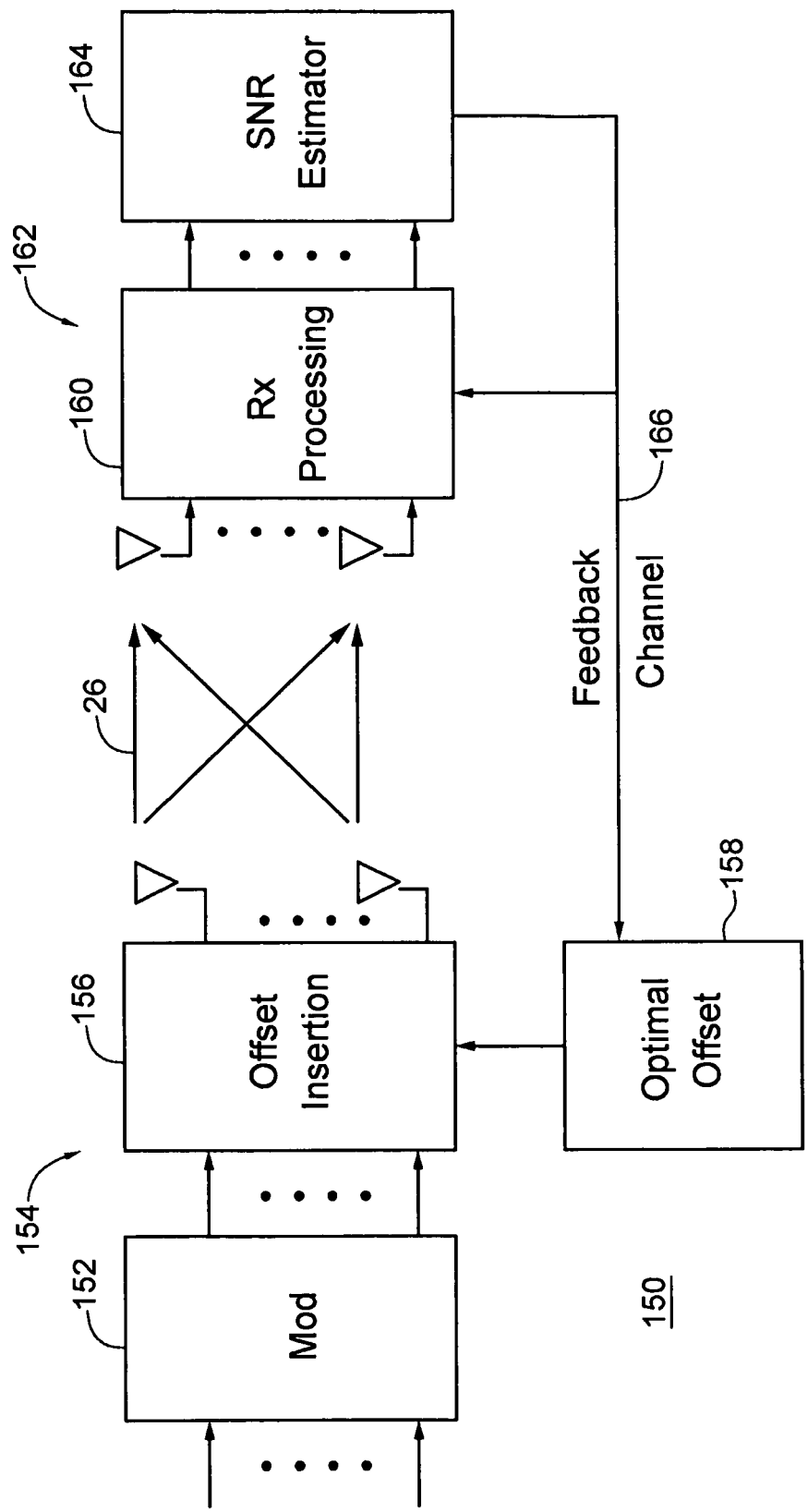
FIG. 9 shows an example transmitter system including a feedback channel for determining an offset, according to another embodiment of the present invention.

FIG. 9 depicts another system 150 that is a variation on the system 20 shown in FIG. 3. After modulation 152, the transmitter 154 ($M_T$ transmitters) introduces an offset 156 that is supplied via an optimal offset determination 158. As shown in FIG. 9, the optimal offset determination can be based on the processing 160 performed by the receiver 162, as well as a signal to noise estimator 124 incorporated into the receiver. As a nonlimiting example, the offset determination may be provided by using a lookup table (LUT), software via processor, and/or hardware (e.g., field programmable gate array (FPGA), digital signal processor (DSP), and/or ASIC). This LUT could store the optimal offsets (as determined by prior simulations or analysis) for different SNRs. During field operation, depending on the operating SNR, the optimal offset could be looked up from the LUT and applied at the transmitter. A suitable feedback channel 164 may be used to receive feedback from the receiver 162.

Figure 10:
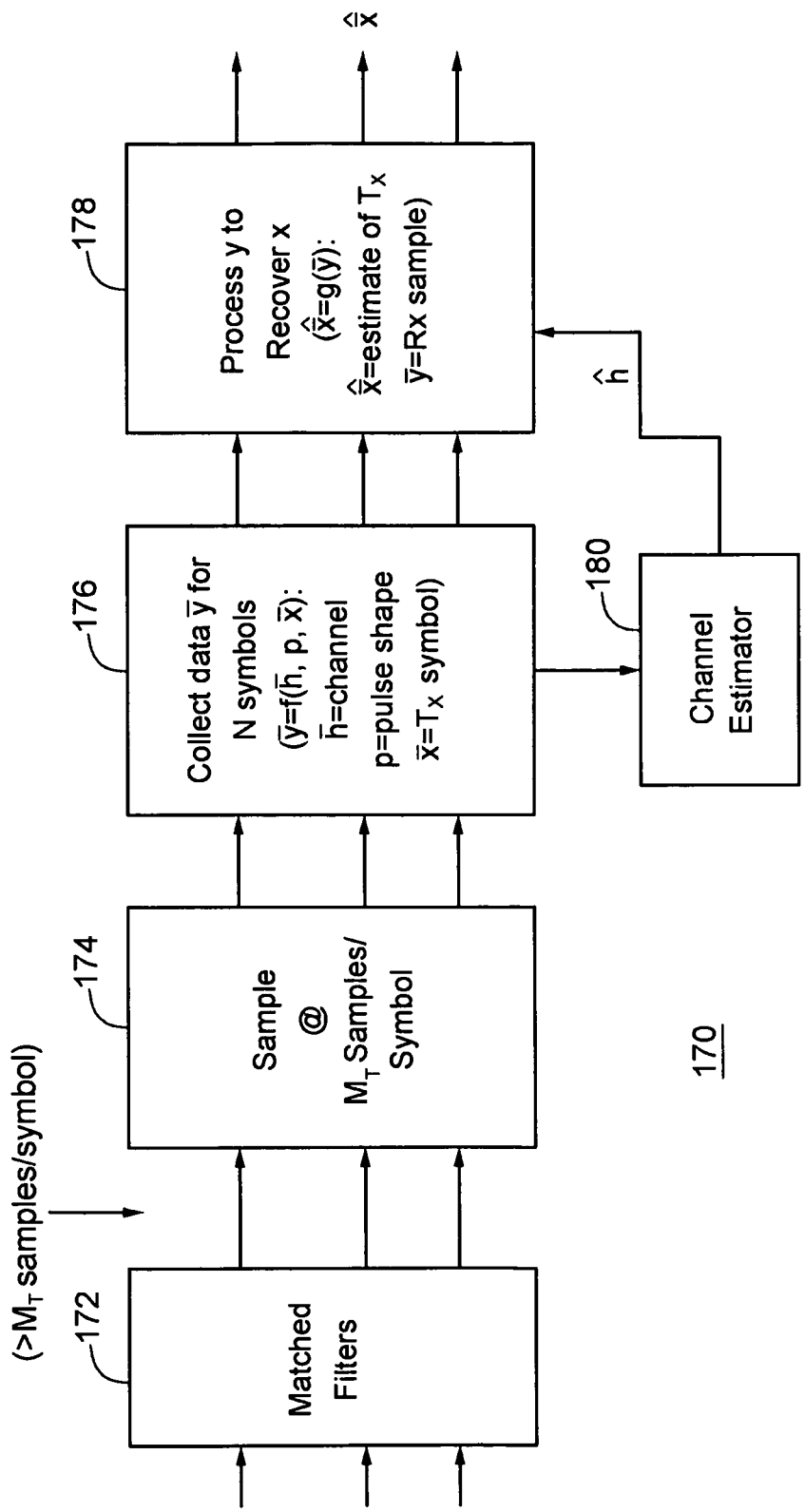
FIG. 10 shows an example receiver using matched filters.

FIG. 10 shows a general reception method 170. Output of $M_T$ matched filters 172 (at greater than $M_T$ samples per symbol) is sampled 174, for example, at $M_T$ samples per symbol. A sample selector and/or interpolation control (e.g., from a timing loop) may be used for sampling. The samples are collected 176 in a signal vector y. Signal vector y is a function of the channel, h, the pulse shape, p, and the transmitted symbols in addition to being distorted by noise. This signal vector y is then processed 178 by a function g, in order to try to recover the transmitted waveform, x (e.g., to provide an estimated waveform $\hat{x}$). The function, g, could be various different functions, including such receivers as the Minimum MeanSquared Error (MMSE) receiver, the Linear MMSE (LMMSE) receiver, the Maximum-Likelihood (ML) receiver, the Maximum Aposterior Probability (MAP) receiver, the Zero Forcing (ZF) receiver or any from a general class of non-linear receivers or any receiver from a general class of linear receivers. A channel estimator 180 is provided to estimate a channel $\hat{h}$, to aid the receiver in the demodulation process. The channel estimator may be a well known channel estimator such as one using preambles.

A more particular explanation of example receiver design and operation will now be provided. For clarity and simplicity of description, a 2 Tx–2 Rx system is considered first. The signals transmitted from the two transmitters are intentionally offset with respect to each other by half the symbol duration (i.e., $\tau=T/2$). The 2 Rx antennas have two receive chains in the exemplary system, and each one used two matched filters— one matched to each of the transmitters. Thus, the matched filters output values are sampled every T/2 secs with every alternate sample corresponding to the pulse transmitted by each of the antennas. Although conceptually it might be easier to think of two matched filters, this is equivalent to having one matched filter per receiver and downsampling the output every T/2 (instead of every T). Let $\rho$ be the correlation between the two offset pulse shaping filters at the optimal sampling points ($\rho=0.5$ for rectangular pulses), and $h_{i,j}$ be the complex gain path from the j-th transmitter to the i-th receiver. Note that channel $h_{ij}$ can depend on time as well as on a symbol by symbol basis. The former case is applicable for block-flat fading channels, as described in certain example embodiments, but the invention is not to be limited to such instances. Then, stacking the i-th output of the two matched filters, the received vector for each of the received antennas is given by $$y_1[i] = \begin{bmatrix} 0 & 0 \\ h_{11}\rho & 0 \end{bmatrix}\begin{bmatrix} b_1[i+1] \\ b_2[i+1] \end{bmatrix} + \begin{bmatrix} h_{11} & h_{12}\rho \\ h_{11}\rho & h_{12} \end{bmatrix}\begin{bmatrix} b_1[i] \\ b_2[i] \end{bmatrix} + \begin{bmatrix} 0 & h_{12}\rho \\ 0 & 0 \end{bmatrix}\begin{bmatrix} b_1[i-1] \\ b_2[i-1] \end{bmatrix} + n_1[i] \quad (1a)$$

$$y_2[i] = \begin{bmatrix} 0 & 0 \\ h_{21}\rho & 0 \end{bmatrix}\begin{bmatrix} b_1[i+1] \\ b_2[i+1] \end{bmatrix} + \begin{bmatrix} h_{21} & h_{22}\rho \\ h_{21}\rho & h_{22} \end{bmatrix}\begin{bmatrix} b_1[i] \\ b_2[i] \end{bmatrix} + \begin{bmatrix} 0 & h_{22}\rho \\ 0 & 0 \end{bmatrix}\begin{bmatrix} b_1[i-1] \\ b_2[i-1] \end{bmatrix} + n_2[i] \quad (1b)$$

where $y_k[i]$ is the i-th output of the pair of matched filters in the k-th receiver, $b_k[i]$ is the i-th transmitted symbol from the k-th transmitter, and $n_k[i]$ is the additive white Gaussian noise (AWGN) noise vector at the i-th time of the k-th receiver. The first row is the output of the matched filter matched to the first transmitter, and the second row is the output of the matched filter matched to the second transmitter. It is seen that when the received matched filter is aligned to the first transmitter, the i-th symbol of the first transmitter not only interferes with the i-th symbol of the second transmitter, but also interferes with the (i–1)-th symbol. The interference power is reduced due to the offset of the transmit pulses from the two transmitters. The above equations can be combined and written more compactly in the following matrix format $$\bar{r}[i] = \begin{bmatrix} y_1[i] \\ y_2[i] \end{bmatrix} = PB[i+1] + QB[i] + RB[i-1] + N[i] \quad (2)$$

To elucidate further, P, Q, and R are all 4×2 matrices, B[i] is a 2×1 vector, and N[i] and $\bar{r}[i]$ are both 4×1 vectors.

A more general case with $M_T$ transmitters and $M_R$ receivers is now considered. In this example, the relative timing offset between adjacent transmitters is $T/M_T$, where T is the symbol duration. Each receiver conceptually has $M_T$ matched filters, each one matched to one of the transmitters (but typically would have a single matched filter sampled $M_T$ times a symbol as shown in FIG. 4). As expected, the formulae shown above are a more particular embodiment of those shown below. It can be shown that the signal of the k-th receiver is a $M_T \times 1$ vector, $y_k[i]$, that may be expressed as $$y_k[i] = R^T[1]Ab[i+1] + R[0]Ab[i] + R[1]Ab[i-1] + n[i] \quad (3)$$

where $$R_{jk}[0] = \begin{cases} 1, & \text{if } j = k \\ \rho_{jk}, & \text{if } j < k \\ \rho_{kj}, & \text{if } j > k \end{cases} \quad (4a)$$

$$R_{jk}[1] = \begin{cases} 0, & \text{if } j \geq k \\ \rho_{kj}, & \text{if } j < k \end{cases} \quad (4b)$$

$$A_k = \text{diag}(h_{k1}, h_{k2}, h_{k3} \ldots h_{kM_T}) \quad (4c)$$

$$\rho_{kl} = \int_{\tau}^{T} s_k(t)s_l(t-\tau)dt \quad (4d)$$

$$\rho_{lk} = \int_{0}^{\tau} s_k(t)s_l(t+T-\tau)dt \quad (4e)$$

An example design for the case where there are two transmitters and two receivers will now be described. However, those of ordinary skill in the art will appreciate that this approach can easily be extended to the more general case of $M_T$ transmitters and $M_R$ receivers. The receivers considered in this example fall in the class of LMMSE receivers, though, as stated above, other classes of receivers may be used according to embodiments of the present invention. It is known that the LMMSE estimate of b, given observations r, is given by $R_{br}R_{rr}^\dagger r$, where † indicates the pseudoinverse, and $R_{xy}=E\{xy^H\}$, where $E\{\}$ is the expectation operator and $()^H$ indicates Hermitian. Two classes of MMSE receivers are analyzed. The first class carries out joint detection of symbols, while the second carries out layered interference cancellation (like VBLAST). For both of these receiver types, one-shot receivers (i.e., those that estimate B[i], given r[i]) and windowed receivers (i.e., those that estimate B[i], given r[i–W] ... r[i+W]) are developed.

One Shot LMMSE Receiver

In this embodiment, the observations, r, are given by Eqn. 2, and only one measurement vector is used to estimate the corresponding information carrying signals. It is assumed that: a) B[i]s are zero mean, unit energy, and uncorrelated; b) $h_{ij}$s are perfectly known at receiver and do not change over the duration of a block of data; and c) the additive Gaussian noise is spatially uncorrelated and also uncorrelated with the information carrying signal. Under these assumptions, from Eqn. 2, we have $$R_{rr} = PP^H + QQ^H + RR^H + R_{NN} \quad (5a)$$

$$R_{B[i]r} = Q^H \quad (5b)$$

In the symbol aligned 2×2 model (VBLAST), $R_{NN}$, the noise covariance matrix, is usually a scaled 2×2 identity matrix. In this example embodiment of the present invention, however, two sets of matched filters are provided per receiver, and so $R_{NN}$ is a 4×4 matrix. By observing that the continuous time AWGN noise is zero mean and independent between the two receivers, and by noting that half of the integration period for each symbol is the same between the two matched filters in the same receiver, it may be shown that $R_{NN}$ is no longer a scaled identity matrix, but is given by $$R_{NN} = \begin{bmatrix} \sigma^2 & \rho\sigma^2 & 0 & 0 \\ \rho\sigma^2 & \sigma^2 & 0 & 0 \\ 0 & 0 & \sigma^2 & \rho\sigma^2 \\ 0 & 0 & \rho\sigma^2 & \sigma^2 \end{bmatrix} \quad (6)$$

The transmitted symbols are thus estimated at the receiver to be $$B[i]_{est} = \text{Quant}\{R_{B[i]r}R_{rr}^{\dagger}(r[i])\} \quad (7)$$

where r[i] is a vector of all observations being used for the estimate of B[i], and the Quant{ } function is used to make hard decisions on the processed samples.

Adjacent Symbol LMMSE Receiver

From the observation model, it is clear that because of correlation between adjacent measurements, an LMMSE receiver that estimates the information symbols using measurements that span more than one symbol duration can lead to improvements. Here, the adjacent symbol LMMSE receiver that utilizes the three received vectors to decide B[i] is considered:

$$\bar{r}[i-1] = PB[i]+QB[i-1]+RB[i-2]+N[i-1] \quad (8a)$$

$$\bar{r}[i] = PB[i+1]+QB[i]+RB[i-1]+N[i] \quad (8b)$$

$$\bar{r}[i+1] = PB[i+2]+QB[i+1]+RB[i]+N[i+1] \quad (8c)$$

These three equations may be stacked and expressed more compactly as $$Y[i] = \begin{bmatrix} R \\ 0 \\ 0 \end{bmatrix} B[i-2] + \begin{bmatrix} Q \\ R \\ 0 \end{bmatrix} B[i-1] + \begin{bmatrix} P \\ Q \\ R \end{bmatrix} B[i] + \quad (9)$$

$$\begin{bmatrix} 0 \\ P \\ Q \end{bmatrix} B[i+1] + \begin{bmatrix} 0 \\ 0 \\ P \end{bmatrix} B[i+2] + N[i]$$

$$= M_1 B[i-2] + M_2 B[i-1] + M_3 B[i] +$$

$$M_4 B[i+1] + M_5 B[i+2] + \bar{N}[i]$$

Note that Y[i] and N[i] are 12×1 vectors, each $M_i$ is a 12×2 matrix, and B[i] is a 2×1 vector. Thus, the LMMSE receiver is given by $$B[i]_{est} = \text{Quant}\{R_{B[i]Y}R_{yy}^{\dagger}(Y[i])\} \quad (10a)$$

$$= \text{Quant}\left\{M_3^H \left(\sum_{i=1}^{5} M_i M_i^H + R_{NN}\right)^{\dagger} (Y[i])\right\} \quad (10b)$$

In this context, $R_{NN}$ is a matrix with similar structure as in Eqn. 6, except that it is a 12×12 matrix. This approach can easily be extended to more general receivers using a wider window of received samples to estimate the i-th transmitted symbol.

The two receivers described above carry out joint decoding of symbols transmitted from the two transmitters. However, a layered-VBLAST type approach where one transmitter is decoded (using a LMMSE receiver) and then the decoded symbols are used to carry out interference cancellation is also provided. This layered approach achieves superior performance in the traditional symbol-aligned case and thus the layered detection should also improve performance in embodiments of the present invention.

It is known that optimal ordering of the decoding layers leads to performance improvements. Decoding the layer with the higher signal to interference plus noise ratio (SINR) (or the lowest error variance) yields the optimal ordering.

Using Eqn. 5, in the case of using a one-shot receiver, the error covariance matrix may be expressed as $$E[(B-\hat{B})(B-\hat{B})^H] = R_{BB} - R_{Br}R_{rr}^{\dagger}R_{rB} \quad (11a)$$

$$= I_{2\times 2} - Q^H(PP^H + QQ^H + RR^H + R_{NN})^{\dagger}Q \quad (11b)$$

Thus, the error variance of decoding the symbol from the first transmitter is given by the magnitude of the (1,1) element, and the error variance of decoding the symbol from the second transmitter is given by the magnitude of the (2,2) element of the 2×2 error covariance matrix. The layer that has the lower error variance (and hence higher SINR) is decoded first.

Determining the optimal delay offset parameter uses a metric of comparison that is the error rate. Thus, optimization is carried out by minimizing the diagonal entries of the error covariance matrix. It can be shown that for a $(M_T, M_R) = (2,1)$ system, as a nonlimiting example, an optimal delay offset $\tau$ is 0.5 as the optimal solution at very low signal to noise ratios (SNRs). This corresponds to a timing offset of half a symbol time between the first and second transmitters. For other values of SNR, there is no simple closed form expression for the optimal $\rho$ or $\tau$. The error variance averaged over many channel instances can be easily plotted as a function of offset $\tau$ by using the following equation.

For a $(M_T, M_R) = (2,1)$ system the received vector r[i] are given by the first two rows of Eqn. 2. Then it may be shown that, given the channel coefficients, and substituting $\rho$ for $\rho_{12}$, $(1-\rho)$ for $\rho_{21}$, and $\beta$ for $\rho^2 + (1-\rho)^2$ the (1,1)-th entry of the error covariance matrix, E, is given by $$E_{11}(\rho) = 1 - \frac{|h_{11}|^2}{K}[|h_{11}|^2(1-\rho)^2 + |h_{12}|^2(1+\rho^2\beta) + \rho^2(1-\rho^2)] \quad (12a)$$

where $$K = (|h_{11}|^2 + \beta|h_{12}|^2 + \sigma^2)(\beta|h_{11}|^2 + |h_{12}|^2 + \sigma^2) - \rho^2(|h_{11}|^2 + |h_{12}|^2 + \sigma^2)^2 \quad (12b)$$

For notational convenience the following substitutions are made, $a = |h_{11}|^2$ and $b = |h_{12}|^2$. It can be shown that in order to minimize the error variance, $\rho$ must satisfy the following quartic equation:

$$A\rho^4 + B\rho^3 + C\rho^2 + D\rho + E = 0 \text{ where} \quad (13a)$$

$$A = -4ab \quad (13b)$$

$$B = -2\sigma^4 + 4a\sigma^2 + 2b^2 - 2a^2 + 8ab \quad (13c)$$

$$C = -3\sigma^4 - (2a+6b)\sigma^2 + 5a^2 - 2ab - 3b^2 \quad (13d)$$

$$D = -4a\sigma^2 - 4a^2 - 4ab \quad (13e)$$

$$E = \sigma^4 + (2a+2b)\sigma^2 + (a+b)^2 \quad (13f)$$

At very low SNRs, when $\sigma^4 \gg \sigma^2$, a, b, one can make the following approximation.

$$-2\sigma^4\rho^3 - 3\sigma^4\rho^2 + \sigma^4 = 0 \quad (14a)$$

$$\Rightarrow (\rho+1)^2(2\rho+1) = 0 \quad (14b)$$

$$\Rightarrow \rho = \tfrac{1}{2} \quad (14c)$$

As expected, as the SNR gets lower, the optimal offset, $\tau$ gets closer to $T_S/2$. At high SNRs, the offset tends to zero. Note that the interference levels are lowest when $\tau = T_2/2$. Yet the optimal offset at high SNRs is not $T_S/2$, but tends to zero as SNRs increase. This seems to indicate that the receiver yields a better bit error ratio (BER) performance in a higher interference environment. This seemingly counterintuitive result may be explained by observing that the higher the SNR, the easier it is for the MMSE receiver to predictively cancel the interference. Thus, the higher interference levels do not adversely affect the receiver, since the interference gets cancelled. For a joint windowed MMSE receiver, the optimal offset is $T_S/2$, regardless of SNR.

Viterbi Algorithm Based Receivers

Since inter symbol interference (ISI) is present in systems according to the present invention, another example receiver is a maximum likelihood sequence detector (MLSD). The Viterbi algorithm (e.g., see G. D. Forney, "The viterbi algorithm", Proceedings of the IEEE, vol. 61, no. 3, pp. 268-278, 1973) is a very well known algorithm for implementing the MLSD in a computationally tractable manner. The usual implementation of the Viterbi algorithm yields the MLSD only if the noise is memoryless and is independent from sample to sample. However, in example embodiments of the present invention, the noise has temporal correlation. More particularly, in example embodiments of the present invention, the zero-mean Gaussian noise process, $n_k[i]$ has the following autocorrelation matrix:

$$\begin{aligned} E[n_k[i]n_l^H[j]] &= \sigma^2 R^T[1], \quad \text{if } j = i+1, \ k = 1 \\ &= \sigma^2 R^T[0], \quad \text{if } j = i, \ k = 1 \\ &= \sigma^2 R[1], \quad \text{if } j = i-1, \ k = 1 \\ &= 0, \quad \text{otherwise} \end{aligned} \quad (15)$$

The usual method to address this noise correlation and to obtain the MLSD, however, leads to an increase in implementation complexity.

For a rectangular pulse, Eqn. 2 reveals a channel memory of three symbol times and with binary phase shift keying (BPSK) signaling with two transmitting antennas, this leads to a total of $2^{2\cdot 3} = 64$ states in the trellis. However, a more careful inspection using the structure of matrices P and R from Eqn. 1 indicates that the channel memory can be reduced to 4 bits and thus results in 16 states.

When the SRRC pulse shape is employed the channel memory depends on the length of the filters employed. An example receiver design according to embodiments of the invention uses a 16-state trellis and pretends that the ISI is only from the adjacent symbols, as higher states may cause the trellis to grow unacceptably large for implementation. Even a smaller state trellis can lead to significant gain over a conventional joint detection scheme. Note that a conventional scheme may not have ISI, and thus sequence detection may not improve its performance in such situations.

Rectangular Pulse Shaping

Figure 11:
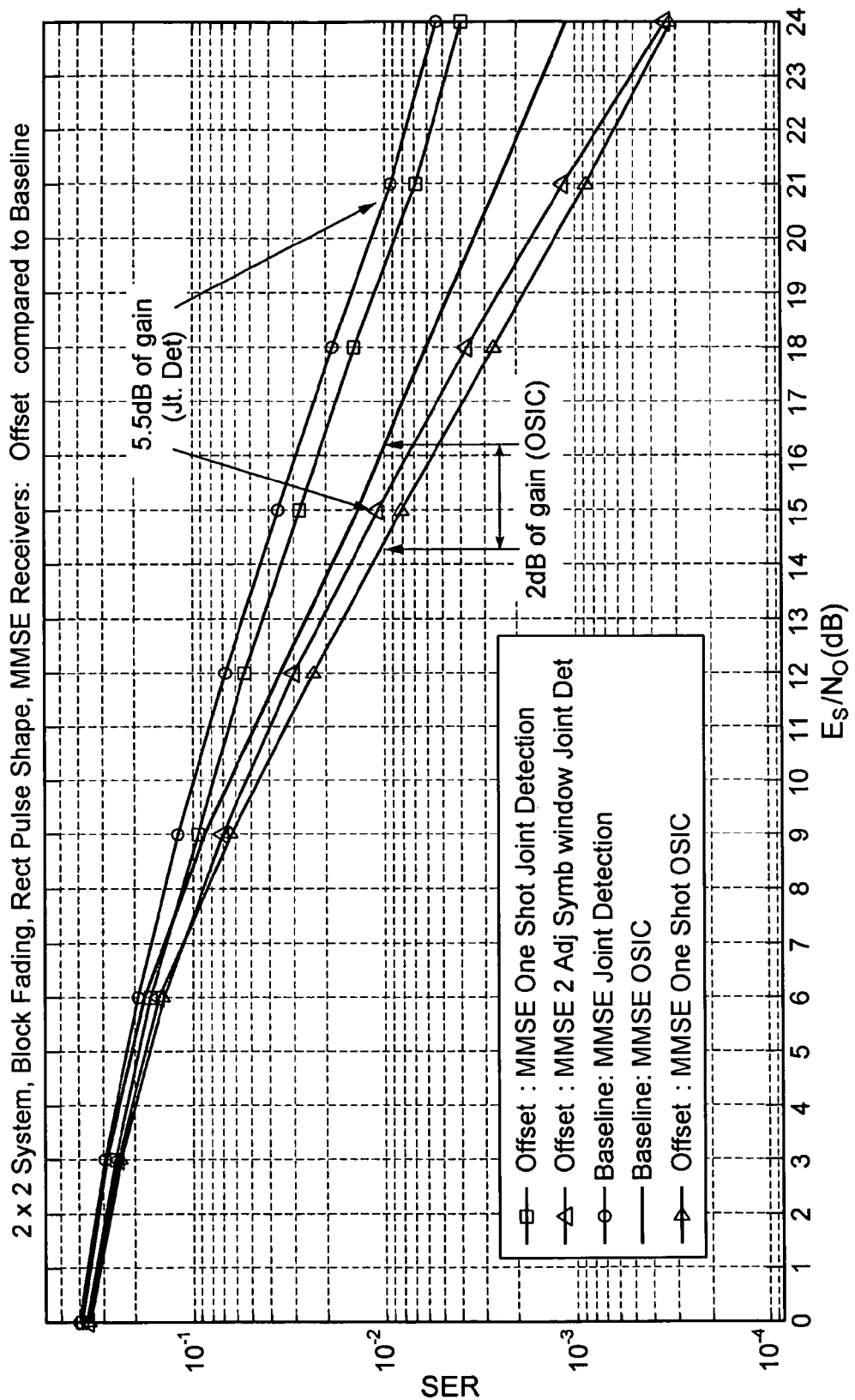
FIG. 11 shows a comparison of a method of the present invention to a baseline (aligned) system using rectangular pulse shaping.

Simulations were carried out and the results of the comparison between embodiments of the present invention using an MMSE receiver and the traditional, aligned systems (referred to herein as "baseline") are shown in FIG. 11. The figure shows the average symbol error rate (SER) as a function of the Es/No (dB). The channel model assumed was a block fading model, where the channel is assumed to be random, but constant, over the block. The channel is assumed to be known perfectly at the receiver and unknown at the transmitter. The modulation scheme employed was quadrature phase shift keying (QPSK) with 8 times oversampling (i.e., 8 samples per symbol).

Simulations were carried out using both empirical simulations (where the covariance matrices were estimated from the data), and theoretical Monte Carlo simulations (where the covariance matrices were evaluated from theoretical equations). Both methods yielded similar results, and only the latter results are presented here for clarity. The simulations were carried out for 8192 blocks, or an equivalent number of channel realizations.

It can be seen that the performance gain for the one-shot receiver is about 3 dB. The receiver with the wider window achieved a further improvement in its performance, showing about 5.5 dB of gains at an SER of 1e-2. It is interesting to note that the adjacent symbol receiver with joint detection outperforms the traditional ordered successive interference cancellation (OSIC) receiver in FIG. 11. Traditional OSIC receivers are more complex, since they require a determination of the optimal decoding order at every layer. Moreover, the cancellation step requires modulation of the decoded bits at the receiver and thus increases receiver complexity. In contrast, the tested method of the present invention embodied in an extended window receiver achieves better performance without requiring ordered cancellation.

Raised Cosine Pulse Shaping

Figure 12:
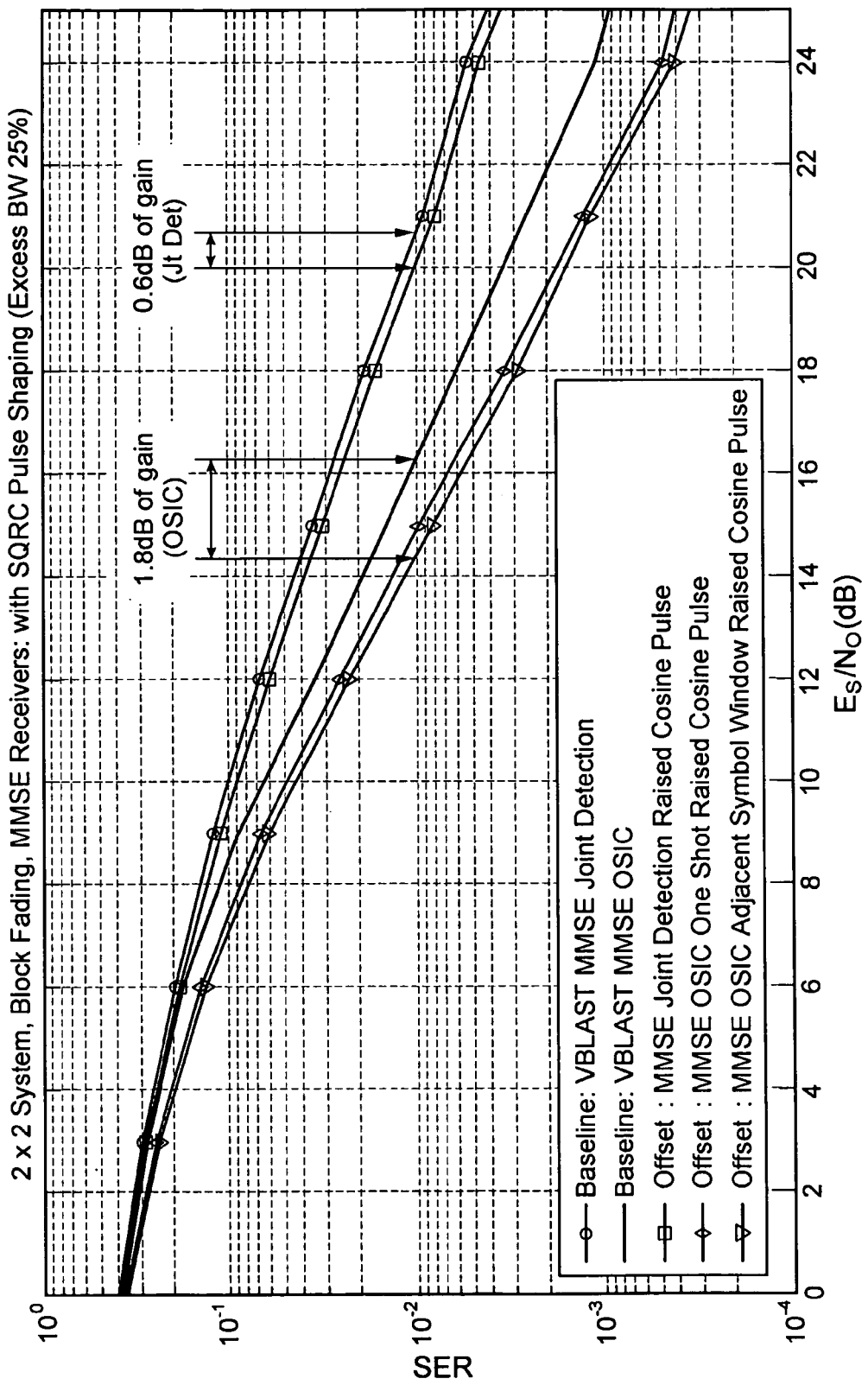
FIG. 12 shows a comparison of a method of the present invention to a baseline (aligned) system using r cosine pulse shaping.

The performance of methods of the present invention with sqrt raised cosine pulse shaping on both the transmitter as well as at the receiver is shown in FIG. 12. Other than the pulse shaping, all the other simulation conditions were the same as in the previous experiment. The performances of the MMSE-OSIC receivers are only shown. The pulse shape used had an excess bandwidth of 25% and was truncated at a length of 12 symbols. Two things may be observed. First, the performance gains of the one-shot receiver with this pulse shaping is worse (by few tenths of dBs) than that of the one-shot receiver with a rectangular pulse shape. This is because $\rho = 0.5$ for the rectangular pulse, but $\rho \approx 0.62$ for the raised cosine pulse. This implies that the reduction in interference power is less for the raised cosine. Second, it can be seen that the performance of the adjacent symbol receiver with r cosine pulse shaping is only marginally better than that of the one-shot receiver with r cosine pulse shaping. This can be contrasted to the receiver with rectangular pulse shaping, where adjacent symbol receiver demonstrated significant gains over the one-shot receiver. This is probably because the one-shot receiver with r cosine pulse shaping has significant information about the adjacent symbols due to ISI introduced b the pulse when it is sampled at an offset of half a symbol. Thus, the additional information provided by the adjacent symbol receiver is relatively minor, thus resulting in marginal performance gains.

Preferred embodiment receivers of the invention are windowed receivers, which can extract maximum performance gains from the symbol timing relative offset communication methods of embodiments of the invention. However, other receivers will see performance benefits from use of example embodiments of the invention, including even a one-shot receiver. A suitably designed receiver can utilize methods of the present invention to realize significant performance gains in comparison to an equivalent system having no timing offset.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

The invention claimed is:

1. A multi-antenna communication method, the method comprising:
   accepting a plurality of n data sources;
   preparing a plurality of $M_T$ independent data streams for transmission through a plurality of $M_T$ different antennae; and
   introducing a sub-symbol timing offset between symbols in the plurality of $M_T$ independent data streams transmitted by adjacent ones of the plurality of $M_T$ different antennae, wherein the sub-symbol timing offset is of a duration $\tau$, where $0 \leq \tau < T$, and where T is a symbol duration.

2. The method of claim 1, wherein the sub-symbol timing offset is proportional to $M_T$.

3. The method of claim 1, wherein said preparing comprises, for each of the $M_T$ independent data streams, pulse shaping said modulated data stream.

4. The method of claim 3, wherein said pulse shaping comprises rectangular pulse shaping.

5. The method of claim 3, wherein said pulse shaping comprises square root raised cosine pulse shaping.

6. The method of claim 3, wherein said pulse shaping comprises square root Nyquist pulse shaping with non-zero excess bandwidth.

7. The method of claim 3, wherein said pulse shaping for at least one of the $M_T$ independent data streams uses a different pulse shaping filter than another of the $M_T$ independent data streams.

8. The method of claim 1, wherein the sub-symbol timing offset is constant between pairs of adjacent ones of the $M_T$ different antennae.

9. The method of claim 1, wherein the sub-symbol timing offset varies between pairs of adjacent ones of the $M_T$ different antennae.

10. The method of claim 1, further comprising:
    transmitting said prepared data streams with said introduced sub-symbol offset via $M_T$ different antennae.

11. The method of claim 1, wherein the sub-symbol offset is determined using feedback from a receiver.

12. The method of claim 1, wherein the sub-symbol timing offset creates signals having different powers at the same time at the adjacent ones of the plurality of $M_T$ different antennae.

13. The method of claim 1, further comprising estimating a signal to noise ratio at a receiver and determining an optimal sub-symbol timing offset that depends upon the estimated signal to noise ratio.

14. The method of claim 13, further comprising storing a look up table of optimal sub-symbol timing offsets for a range of signal to noise ratios and selecting the optimal sub-symbol timing offset from the look up table.

15. The method of claim 13, wherein the optimal sub-symbol timing offset comprises minimizing the diagonal entries of the error covariance matrix.

* * * * *